(12) United States Patent
Chen et al.

(10) Patent No.: US 12,242,554 B2
(45) Date of Patent: Mar. 4, 2025

(54) INTELLIGENT CONTENT RECOMMENDATION WITHIN A COMMUNICATION SESSION

(71) Applicant: Zoom Communications, Inc., San Jose, CA (US)

(72) Inventors: Wan Chen, Cupertino, CA (US); Davide Giovanardi, Saratoga, CA (US); Stephen Muchovej, Bishop, CA (US); Xiaoli Song, Redding, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/978,091

(22) Filed: Oct. 31, 2022

(65) Prior Publication Data

US 2024/0143678 A1 May 2, 2024

(51) Int. Cl.
*G06F 16/9535* (2019.01)
*G10L 15/08* (2006.01)

(52) U.S. Cl.
CPC .......... *G06F 16/9535* (2019.01); *G10L 15/08* (2013.01); *G10L 2015/088* (2013.01)

(58) Field of Classification Search
CPC ............ G06F 16/9535; G06F 16/9536; G06F 16/9538; G06F 16/951; G06F 16/953; G06F 16/9532; G10L 15/08; G10L 2015/088
See application file for complete search history.

(56) References Cited

U.S. PATENT DOCUMENTS

| 8,798,995 B1 * | 8/2014 | Edara | G06Q 30/0255 704/211 |
| 10,965,811 B1 * | 3/2021 | Shi | G06Q 10/06393 |
| 11,062,270 B2 * | 7/2021 | Hilleli | G06N 3/045 |
| 11,417,337 B1 * | 8/2022 | Shi | G10L 15/16 |

(Continued)

OTHER PUBLICATIONS

International Search Report and Written Opinion mailed on Jan. 22, 2024 in corresponding PCT Application No. PCT/US2023/034725.

(Continued)

*Primary Examiner* — Kris E Mackes
(74) *Attorney, Agent, or Firm* — Young Basile Hanlon & MacFarlane, P.C.

(57) ABSTRACT

Methods and systems provide for intelligent content recommendation within a communication session. In one embodiment, the system receives a list of content recommendation actions, each content recommendation action being associated with one or more trigger phrases constituting conditions for the content recommendation action to be performed, each trigger phrase being associated with a party the trigger phrase is to be uttered by. The system connects to a communication session with a plurality of participants, and receives a number of utterances associated with the participants in real time. For each utterance, the system determines whether a prediction of relatedness is present between the utterance and one or more trigger phrases associated with a content recommendation action. Upon determining that a prediction of relatedness is present, the system performs the associated content recommendation action by transmitting, to one or more client devices, one or more pieces of content to be recommended.

20 Claims, 7 Drawing Sheets

(56) References Cited

U.S. PATENT DOCUMENTS

| | | | |
|---|---|---|---|
| 2018/0226069 A1 | 8/2018 | Fleischman et al. | |
| 2021/0334068 A1* | 10/2021 | Rangaraju | G06F 3/04817 |
| 2023/0014775 A1* | 1/2023 | Dotan-Cohen | H04L 51/046 |
| 2023/0385778 A1* | 11/2023 | Johnson, III | G06Q 10/1095 |

OTHER PUBLICATIONS

Oneata Dan et al: "An Evaluation of Word-Level Confidence Estimation for End-to-End Automatic Speech Recognition", 2021 IEEE Spoken Language Technology Workshop (SL T), IEEE, Jan. 19, 2021 (Jan. 19, 2021), pp. 258-265, XP033891258, DOI: 10.1109/SL T48900.2021.9383570 [retrieved on Mar. 22, 2021].

Wiggers Kyle: "Zoom launches AI-powered features aimed at sales teams", Apr. 13, 2022 (Apr. 13, 2022), XP093115255, Retrieved from the Internet: URL:https://techcrunch.com/2022/04/13/zoom-launches-ai••powered-featu res-aimed-at-sales-teams/ [retrieved on Jan. 2, 2024].

\* cited by examiner

Card Content ⓘ                                    Preview Card

310 —
Rep Response

Tell the customer that Product A is $10 per month and Product B is $25 per month.

320 —
Add a Link (Optional)

aerolabs.io/pricing

Visit Pricing Page

330 —
Trigger Words/Phrases ⓘ          | Triggered by Anyone ▽ | — 360

340 —
Press [Enter] or Comma After Ea[ch]   | Triggered by Anyone |
                                      | Triggered by Rep |
| How Much is the Product × | What | Triggered by Customer |
350 —
| How Much Would it Be × | What's |
| What's the Cost × | Price × | How Much is it × |

FIG. 3

INTELLIGENT CONTENT RECOMMENDATION WITHIN A COMMUNICATION SESSION

FIELD OF INVENTION

The present invention relates generally to digital communication, and more particularly, to systems and methods for providing intelligent content recommendation within a communication session.

SUMMARY

The appended claims may serve as a summary of this application.

BRIEF DESCRIPTION OF THE DRAWINGS

The present invention relates generally to digital communication, and more particularly, to systems and methods for providing intelligent content recommendation within a communication session.

The present disclosure will become better understood from the detailed description and the drawings, wherein:

FIG. 3 is a diagram illustrating an example of a user interface allowing a user to configure a content recommendation action to be associated with a number of trigger phrases.

DETAILED DESCRIPTION

Figure 1A:
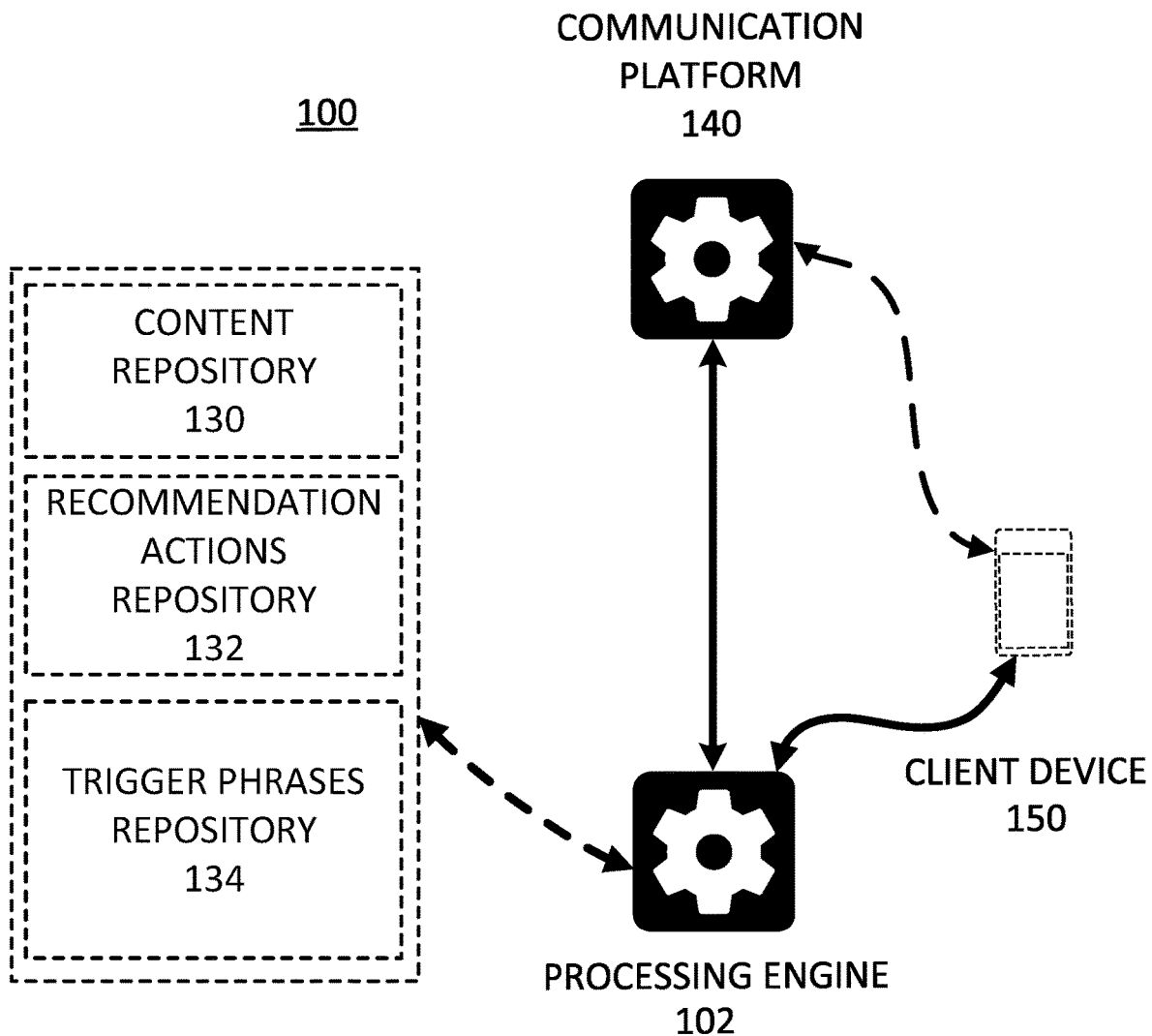
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and must be reviewed after the meeting has ended. The communications platforms which host the meetings do not provide the sorts of real-time intelligence and resources during a meeting that such a sales team would find highly relevant and useful to their needs.

In particular, sales representatives, customer service agents, technical support agents, and others often have a slew of information available to them that can provide responses and recommendations to potential and current customers or clients. However, if they do not immediately recall the information, they must search through their prior documentation and reference materials to find the relevant piece of information. This typically decreases the efficiency of a meeting and degrades the flow of conversation.

Thus, there is a need in the field of digital communication tools and platforms to create a new and useful system and method for providing intelligent content recommendation within a communication session. The source of the problem, as discovered by the inventors, is a lack of ability for the representative or agent to be presented with content that is recommended as a response or answer to the other party upon one or both of the parties speaking words or phrases that signal they are asking for something the content will be useful in answering. Such materials may be populated ahead of time. For example, a reference document on upcoming promotions, a legal document, or a compliance metric may be presented to an agent upon a customer asking a triggering question about promotions, legal aspects, or compliance aspects, respectively.

In one embodiment, the system receives a list of content recommendation actions, each content recommendation action being associated with one or more trigger phrases constituting conditions for the content recommendation action to be performed, each trigger phrase being associated with a party the trigger phrase is to be uttered by. The system connects to a communication session with a number of participants, and receives a number of utterances associated with the participants in real time during the communication session. For each utterance, the system determines whether a prediction of relatedness is present between the utterance and one or more trigger phrases associated with a content recommendation action from the list of content recommendation actions. Upon determining that a prediction of relatedness is present, the system performs the associated content recommendation action by transmitting, to one or more client devices, one or more pieces of content to be recommended.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a content repository 130, recommendation actions repository 132, and/or a trigger phrases repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
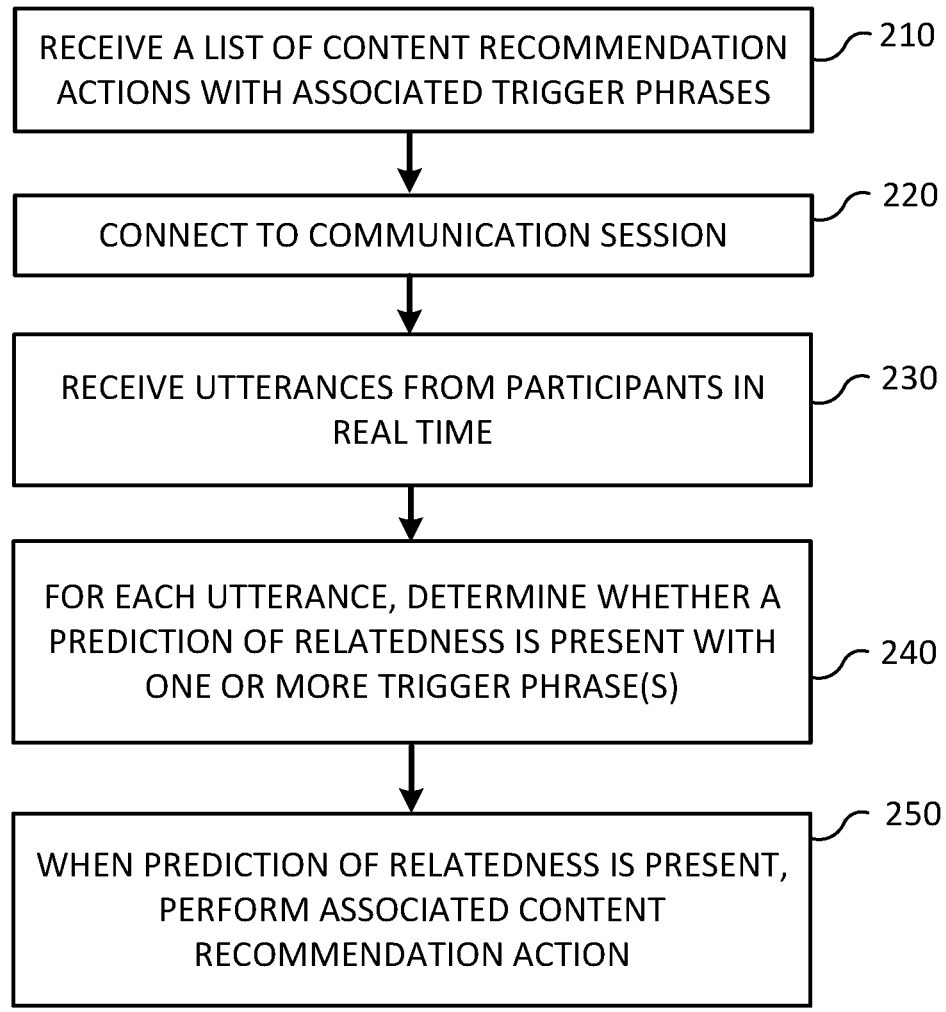
FIG. 2 is a flow chart illustrating an exemplary method that may be performed in some embodiments.

In an embodiment, the processing engine 102 may perform the exemplary method of FIG. 2 or other method herein and, as a result, provide intelligent content recommendation within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a content repository 130, recommendation actions repository 132, and/or trigger phrases repository 134. The optional repositories function to store and/or maintain, respectively, submitted content to be recommended; recommendation actions to be performed upon associated trigger phrases being uttered in the communication session; and trigger phrases which may be associated with certain recommendation actions. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
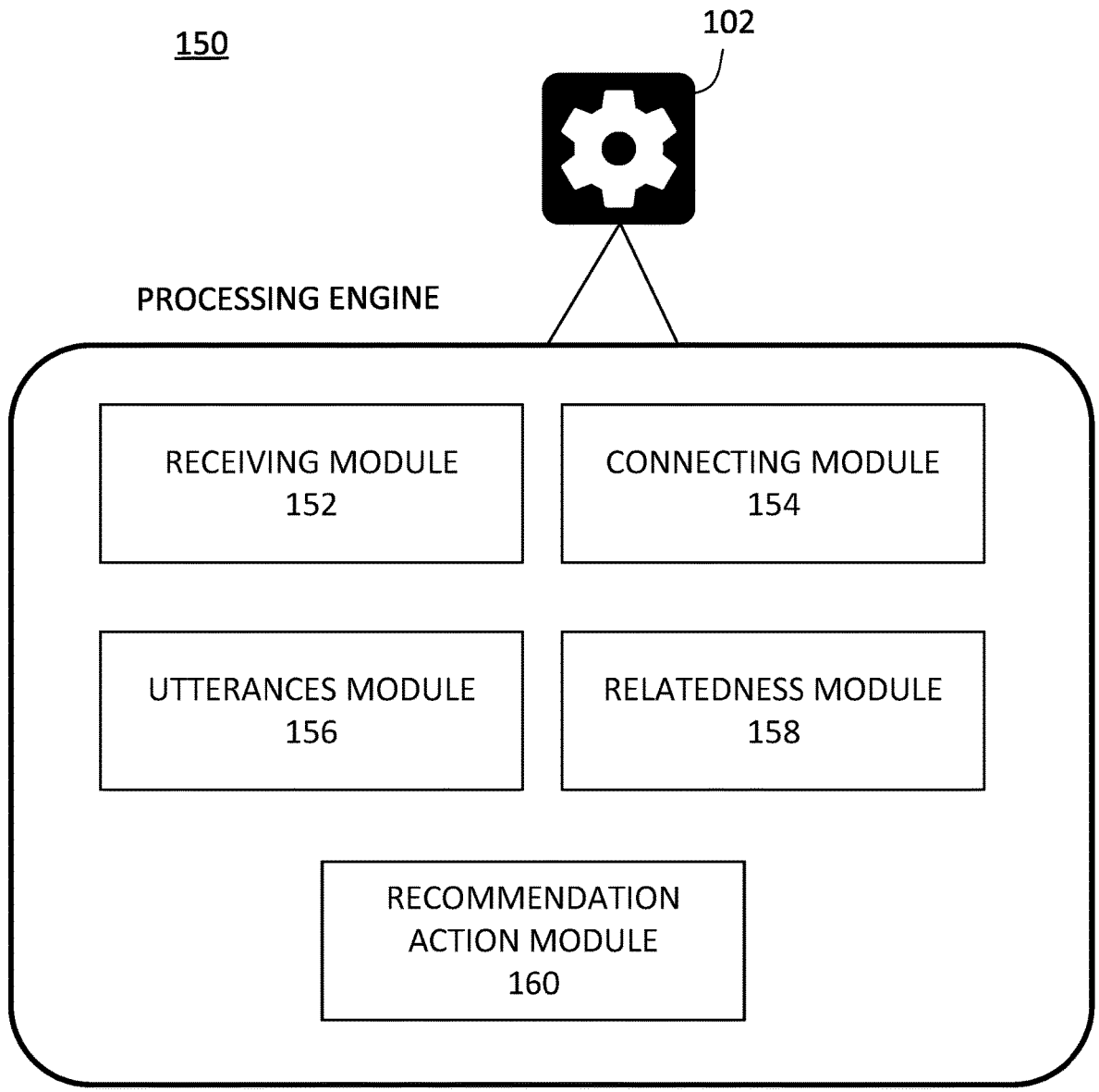
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive a list of content recommendation actions, each content recommendation action being associated with one or more trigger phrases constituting conditions for the content recommendation action to be performed, each trigger phrase being associated with a party the trigger phrase is to be uttered by.

Connecting module 154 functions to connect to a communication session with a number of participants.

Utterances module 156 functions to receive a number of utterances associated with the participants in real time during the communication session.

Relatedness module 158 functions to determine, for each utterance, whether a prediction of relatedness is present between the utterance and one or more trigger phrases associated with a content recommendation action from the list of content recommendation actions.

Recommendation action module 160 functions to, upon determining that a prediction of relatedness is present, perform the associated content recommendation action by transmitting, to one or more client devices, one or more pieces of content to be recommended.

The above modules and their functions will be described in further detail in relation to an exemplary method below.

FIG. 2A is a flow chart illustrating an exemplary method that may be performed in some embodiments.

At step 210, the system functions to receive a list of content recommendation actions, each content recommendation action being associated with one or more associated trigger phrases. The trigger phrases constitute conditions for the content recommendation action to be performed, and each trigger phrase is associated with a party the trigger phrase is to be uttered by.

A content recommendation action may be any action to be performed in order to recommend content for a recipient party, such as an agent or representative, to send to, share, summarize, or otherwise provide in some fashion to a customer party, such as a participant who is a current or prospective customer or client of the recipient party or their organization. For example, in a call center context, via a content recommendation action, a call center agent would be provided with content, words, or other material to share or summarize with the customer who is the other party to the communication session. Each content recommendation action is associated with one or more "trigger phrases", each of which may take the form of a word, string of words, sentence, or phrase. A trigger phrase is meant to be a trigger which satisfies a condition for the content recommendation action to be performed. For example, upon a call center customer saying, "can you give me a discount?", the trigger phrase "give me a discount" is triggered for the content recommendation action whereby a representative response "We currently have a 10% off sale on this product" can be provided to the call center agent, along with a link to more details on the discount pricing. The agent can then repeat the words provided by the representative response and share the link with the customer. In another example, the representative may say "let me tell you about our current offerings", and the representative uttering these words may trigger a recommendation action because the utterances are similar enough within a similarity threshold to a trigger phrase, "current products". The content recommendation action may then be a list of current products that are offered by the company. Many more such examples of content recommendation actions, trigger phrases, and triggering parties may be contemplated.

In some embodiments, a user, such as, e.g., a participant, host, or administrator of the communication session, submits the recommendation actions and associated trigger phrases via a user interface ("UI"), such as the UI described with respect to FIG. 3 below. In some embodiments, this submission occurs prior to the communication session taking place, and prior to connecting to the communication session. Upon the user submitting the content recommendation actions and trigger phrases via the UI, the system transmits them to the system, which receives them. In some embodiments, the user also selects a party category to be associated with each trigger phrase. For example, a trigger phrase may be classified in the party category of "triggered by customer", which signals that the customer, i.e., a participant in the customer party, must utter the trigger word or phrase or some variation on it in order for the condition to be satisfied by which the content recommendation action is performed. Other party categories may include "triggered by representative", i.e., triggered by an utterance spoken by the representative or recipient party, and "triggered by anyone", by which anyone uttering the trigger word or phrase triggers the condition by which the content recommendation action is performed. In some embodiments, the party associated with each trigger phrase may be a recipient party, a customer party, or both. This may be considered a "party category" which is used to categorize a trigger phrase. In some embodiments, the one or more pieces of content to be recommended are directed to a recipient party to provide a response to a customer party. In some embodiments, the recipient party includes one or more of, e.g., a sales agent, a customer service agent, and/or a technical support agent, although any other suitable possibility for participants speaking within a communication session may be contemplated.

In some embodiments, a subset of the trigger phrases are each associated with a plurality of content recommendation actions. That is, each trigger phrase may potentially be associated with multiple content recommendation actions, without conflict. If the trigger phrase triggers the content recommendation actions, then they are performed simultaneously to provide, e.g., multiple pieces of content or multiple responses to the recipient party.

In some embodiments, at least a subset of the content recommendation actions includes at least one of, e.g., a recommended response to be uttered, one or more pieces of content to be recommended, and/or one or more content links to be provided. Other possibilities for content and/or actions may be contemplated as being part of content recommendation actions.

In some embodiments, the system receives a number of pieces of content. In some embodiments, a user may submit this content or provide the system with access to a repository of content. This can be seen as a repository of content which can be recommended as part of content recommendation actions. After receiving this content, the system can then extract, from each piece of content, a number of keywords (e.g., five to ten keywords) representing the content. For each utterance, the system can determine whether a prediction of relatedness is present between the utterance and the plurality of keywords representing the content. Upon determining that a prediction of relatedness is present, the system can transmit, to one or more client devices, one or more pieces of content from which the related keyword was extracted.

In some embodiments, the system detects that one of the trigger phrases has been associated with a content recommendation action that differs in intent from the trigger phrase, and then associates the trigger phrase with a different content recommendation action. In some embodiments, the system may perform intent detection on the trigger phrases and/or the content recommendation actions to determine whether the intent of the associated trigger phrases align with the intent of the content recommendation actions. Intent detection techniques with respect to content, phrases, or utterances is described in further detail below with respect to step 240.

At step 220, the system connects to a communication session having a number of participants. A communication session may be e.g., a remote video session, audio session, chat session, or any other suitable communication session. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 230, the system receives a number of utterances associated with participants received in real time during the communication session. In some embodiments, the system receives the utterances in the form of a transcript of the communication session between the participants. In some embodiments, the transcript includes timestamps for the utterances associated with speaking participants.

The utterances the system receives relate to a conversation between the participants that is produced during the communication session. That is, the conversation which was produced during the communication is used to generate a transcribed number of utterances spoken by the participants. This may be in the form of a transcript, a stream of utterances, real-time captions, or other forms. In various embodiments, the utterances are either generated by the system, or are generated elsewhere and retrieved by the system for use in the present systems and methods. In some embodiments, the utterances are textual in nature. In some embodiments, the utterances are composed of one or more sentences attached to a specific speaker of that sentence (i.e., participant). Timestamps may be attached to each utterance and/or each sentence. In some embodiments, the utterances are generated in real-time while the communication session is underway, and are presented as a transcript after the meeting has terminated. In other embodiments, the utterances are generated in real-time during the session and also presented in real-time during the session. In some embodiments, automatic speech recognition ("ASR") techniques are used in whole or in part for generating the utterances or transcript. In some embodiments, machine learning ("ML") or other artificial intelligence ("AI") models may be used in whole or in part to generate the utterances or transcript. In some embodiments, natural language processing ("NLP") techniques may be used in whole or in part to generate the utterances or transcript.

At step 240, for each of the utterances, the system determines whether a prediction of relatedness is present between the utterance and one or more trigger phrases associated with a content recommendation action from the list of content recommendation actions.

In some embodiments, an intent detection algorithm is employed to determine whether one or more predictions of relatedness are present between the utterance and the trigger phrases associated with content recommendation actions. In some embodiments, the intent detection algorithm functions by identifying utterances in the transcript which indicate one or more areas of interest that should be brought to the attention of the user. In some embodiments, the identity detection algorithm is an AI algorithm, such as, e.g., a deep learning, meta-learning, or other AI algorithm which makes use of neural networks. In some embodiments, the intent detection algorithm performs the determination of predictions of relatedness without any pre-training, i.e., without making use of training data. In such cases, the algorithm uses the trigger phrases as inputs representing particular sentence structures which indicate an area of interest within the conversation.

In some embodiments, the intent detection algorithm makes use of prototypical neural networks ("ProtoNets") in order to perform intention detection tasks in low data regimes where there may be limited or no pre-training or training data used.

In such cases, the algorithm functions based on the idea that there exists an embedding space in which points cluster around a single prototype representation for each class. The algorithm then learns a non-linear mapping that projects input sentences into that embedding space, using a neural network. The algorithm takes the class's prototype to be the means of its support set in the embedding space.

In some embodiments, few-shot intent detection techniques are employed, where few-shot prototypes are computed as the mean of embedded support examples for each class. In other embodiments, zero-shot intent detection techniques are employed, where zero-shot prototypes are produced by embedding class meta-data. In either case, embedded query points are classified via a softmax over distances to class prototypes.

In some embodiments, pre-trained language models, such as, e.g., pre-training sentence embedding language models, are employed. For example, in various embodiments, the algorithm may employ one or more open source language model libraries for sentence transformer models, such as, for example, RoBERTa, BERT, all-mpnet-base-v2, or all-MiniLM-L6-v2. In some embodiments, this training functions to allow the encoder to learn to project sentences or phrases into a meaningful latent space, i.e., a space where the algorithm can perform distance computations and assign a query to its prototype.

In some embodiments, such models are trained within a meta-learning framework. In such cases, the meta-learning framework allows the model to generalize well to new classes at test time. Within such a meta-learning framework, the model is presented with a brand new task with unseen inputs and unseen classes that the model has never been exposed to during training. This differs from traditional ML where at test time there are unseen inputs, but the ML model is asked to predict the same classes. In this case, the model is asked to learn to predict new classes given new inputs, and thus is forced to generalize to unseen data, which is important to few-shot settings in particular where the model needs to quickly adjust to new data and classes.

In some embodiments, matching networks are employed to provide a way to assign a class label to a query, where the encoder learns to project sentences or phrases into the learned embedding space and then outputs the class that is closer in distance to the embedded queries. In some embodiments, whenever a number of example phrases is greater than 1, the algorithm aggregates those phrases into so-called prototypes, and assigns the class based on the closest prototype. In some embodiments, once those prototypes are derived in embedding space, class assignment is made based on distance metrics. In some embodiments, the distance criteria may be a calculation of Euclidean distance, while in other embodiments, the distance criteria may be a calculation of cosine similarity.

In some embodiments, determining whether the predictions of relatedness are present includes determining whether a prediction of relatedness is present between the utterance and one or more variations on the one or more trigger phrases associated with the content recommendation action. In such embodiments, trigger phrases need not have an exact match to utterances, but rather a fuzzy or similarity match can occur in order for a prediction of relatedness to be present.

In some embodiments, a similarity threshold is employed, by which a prediction of relatedness is only present if a similarity score between an utterance and a trigger phrase exceeds the threshold.

In some embodiments, determining whether a prediction of relatedness is present is performed at least in part by one or more sentence embedding models.

At step 250, upon determining that a prediction of relatedness is present, the system performs the associated content recommendation action by transmitting, to one or more client devices, one or more pieces of content to be recommended. In some embodiments, the means that the content recommendation action associated with the related trigger phrase is performed. In some embodiments, multiple content recommendation actions are performed for a single trigger phrase. In some embodiments, one or more pieces of content from a user-submitted content repository are transmitted to the client device(s).

In some embodiments, the system is configured to generate, based on the received list of content recommendation actions, one or more additional trigger phrases to be associated with one or more of the content recommendation actions. In some embodiments, the additional trigger phrases are dynamically generated based on variations of the existing trigger phrases, extracted keywords from content that has been submitted, metadata, utterances, or any other relevant data.

FIG. 3 is a diagram illustrating an example of a user interface allowing a user to configure a content recommendation action to be associated with a number of trigger phrases.

Within the presented UI, a "card" is displayed. The card represents a content recommendation action which is to be performed when one of the associated trigger words or phrases is uttered by a specified party or parties to the conversation. Within the UI, a user of the communication platform with privileges and permissions to generate content recommendation actions is allowed to generate a content recommendation action and populate it with associated trigger words or phrases. A rep response 310 is an intended response from a representative that is to be displayed for the recipient party as part of the content recommendation actions. A user may write a custom response. In some embodiments, a default response is provided. In some embodiments, a response is automatically generated based on the trigger phrases and/or any associated links or documents. A link address and link description 320 may be specified for display to a recipient party as well. For example, the recipient party may pass along the link to a customer in the customer party, with the link containing instructions for resolving the customer's technical issue.

Trigger words or phrases 330 are displayed in the bottom section of the card. A text field 340 allows a user to enter one or more new trigger phrases to be associated with the content recommendation action. Some trigger phrases 350 have been associated with this content recommendation action already, including, e.g., "how much is the product", "how much would it be", "what's the cost", "price", and "how much is it". Each trigger word or phrase is categorized based on which party or parties are to utter the word or phrase in order for the content recommendation action to be triggered. A drop down menu 360 allows a user to navigate through the trigger phrases by party category. The party categories displayed include "triggered by rep", to be triggered by the recipient party's utterances; "triggered by customer", to be triggered by the customer party's utterances; and "triggered by anyone", to be triggered by either the recipient party or the customer party.

Figure 4:
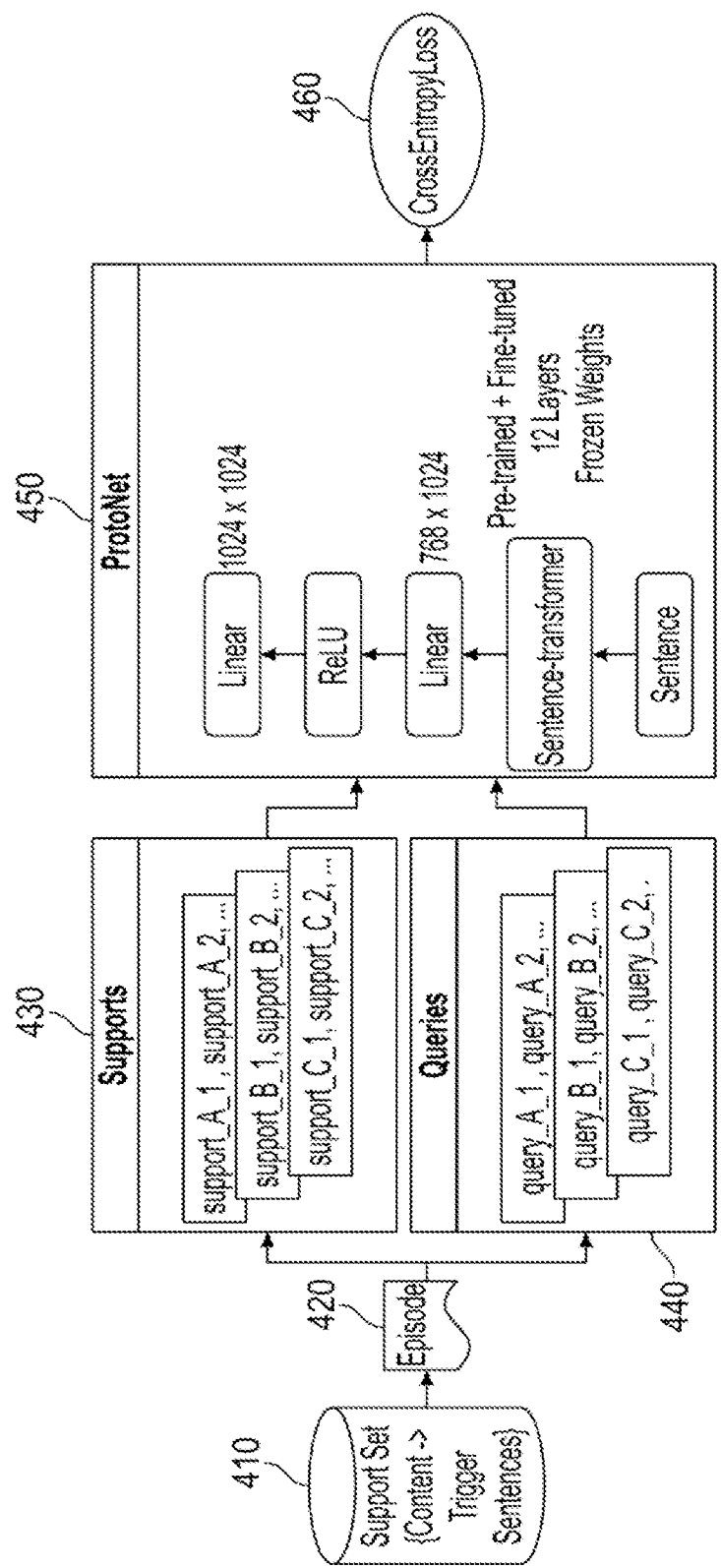
FIG. 4 is a diagram illustrating one exemplary method for an intent detection algorithm to operate to determine whether predictions of relatedness exist between utterances in a transcript and trigger phrases associated with content recommendation actions.

FIG. 4 is a diagram illustrating one exemplary method for an intent detection algorithm to operate to determine whether predictions of relatedness exist between utterances in a transcript and trigger phrases associated with content recommendation actions.

On the far left of the diagram, a support set 410 is retrieved. The support set 410 acts as a mapping between content and trigger sentences, e.g., trigger words or phrases. From this support set, one or more episodes 420 is generated. The data from the support set 410 is organized into an episodic data loader. In some embodiments, this organization is the result of a meta-learning framework, as described above. The episode 420 includes one or more supports 430 and one or more queries 440. Supports represent sentences, phrases, or examples that are used to create anchors, i.e., trigger phases. Supports 430 can function as representatives for different content recommendation actions to be performed. For example, Support_A may be a category of Content Recommendation Action A, and there may be multiple such content recommendation actions (A, B, C, etc.) that are sought to be classified. Queries 440 represent an evaluation set which matches a particular class. Examples of queries within the support of Content Recommendation Action A may be, e.g., "What's the cost for this?" or "I hope this fits my budget". In some embodiments, content recommendation actions as described above may be considered supports, and trigger phrases as described above may be considered queries.

The prototypical neural network, or ProtoNet 450 functions to generate class prototypes based on the supports and queries. The ProtoNet assigns a given query to the right support. In some embodiments, for each of the supports and query sentences or phrases, the algorithm passes the query through a sentence transformer. In some embodiments, the sentence transformer makes use of the pre-trained weights of a particular language model. In some embodiments, fine-tuning is performed on these pre-trained weights to improve the functioning and results of the sentence transformer. In some embodiments, the sentence transformer has multiple layers, as in this case 12 layers are present. In some embodiments, these multiple layers are fine-tuned and/or initialized from scratch. In some embodiments, the sentence transformer makes use of frozen weights. In some embodiments, the sentence transformed is further pre-trained on general domain data, or on domain data that may be specific to the user or other users similar to the user, in order to encode the sentences better for more accurate results for the user.

In the example here, a 2-layer feed forward network is employed, where a linear mapping is performed where the dimensions of the embedding are 768×1024, a rectified linear unit ("ReLU") is employed, and then another linear mapping is performed where the dimension of the embedding is 1024×1024. This results in a non-linear mapping to another embedding space, where the algorithm can perform prototype matching. The algorithm attempts to assign the query to the closest prototype, such as by calculating cosine simularity or Euclidean distance.

On the far right of the diagram, cross entropy loss 460 is computed, then back propagation occurs. This is performed to improve this embedding space and to assign queries in a correct manner.

While ML models and intent detection models have been discussed in detail above, many other such forms of predicting relatedness between utterances and trigger phrases may be contemplated.

Figure 5:
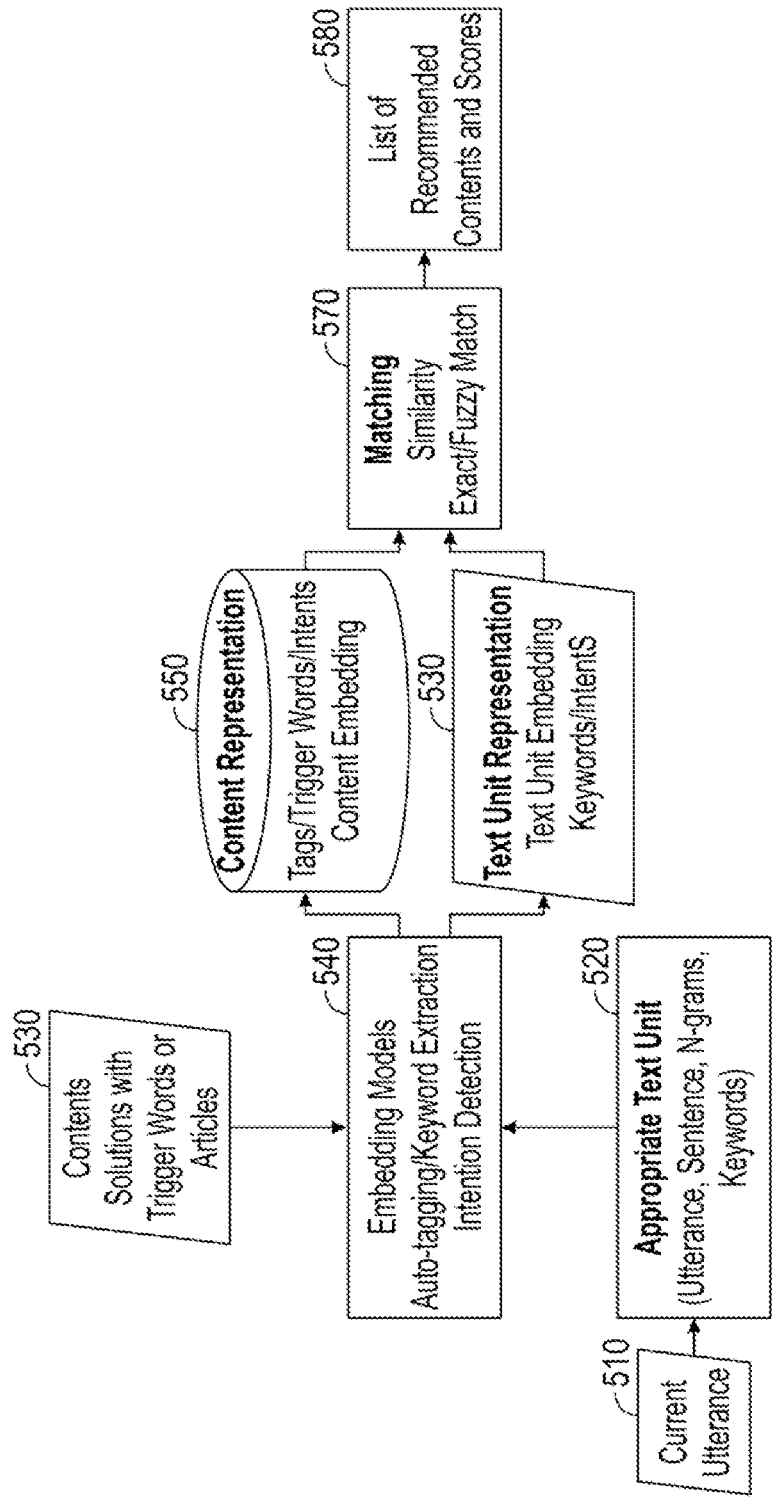
FIG. 5 is a flow chart illustrating an exemplary method for providing intelligent content recommendations that may be performed in some embodiments.

FIG. 5 is a flow chart illustrating an exemplary method for providing intelligent content recommendations that may be performed in some embodiments.

At step 510, a current utterance is received from a number of utterances being received in real time for a communication session in progress. At step 520, the current utterance is processed into an appropriate text unit. This may be, e.g., an utterance, sentence, n-gram, or keyword.

At step 530, a list of articles or contents solutions, i.e., content recommendation actions, are received by the system, with each content recommendation action being associated with trigger words. In some embodiments, the list of content recommendation actions may resemble the information generated via the "card" UI presented as an example above in FIG. 3.

At step 540, the system uses embedding models to auto-tag the utterance as being and/or extract keywords from the utterance, and performs intent detection on the utterance to determine an intent for the utterance. At step 550, content embedding is performed on one or more of tags, trigger words or phrases, and/or detected intents. At step 560, text unit embedding is performed on one or both of extracted keywords and/or intents.

At step 570, similarity matching is performed on the utterance with respect to the trigger phrases associated with the content recommendation actions. The matching may be an exact match or fuzzy match to include matching of the utterance with variations on the trigger phrases. At step 580, the system provides a list of recommended content and similarity scores. For similarity scores that exceed a similarity threshold, the recommended content is displayed and any other recommended content actions are performed, e.g., displaying of a representative response, displaying of a link, or any other suitable actions.

Figure 6:
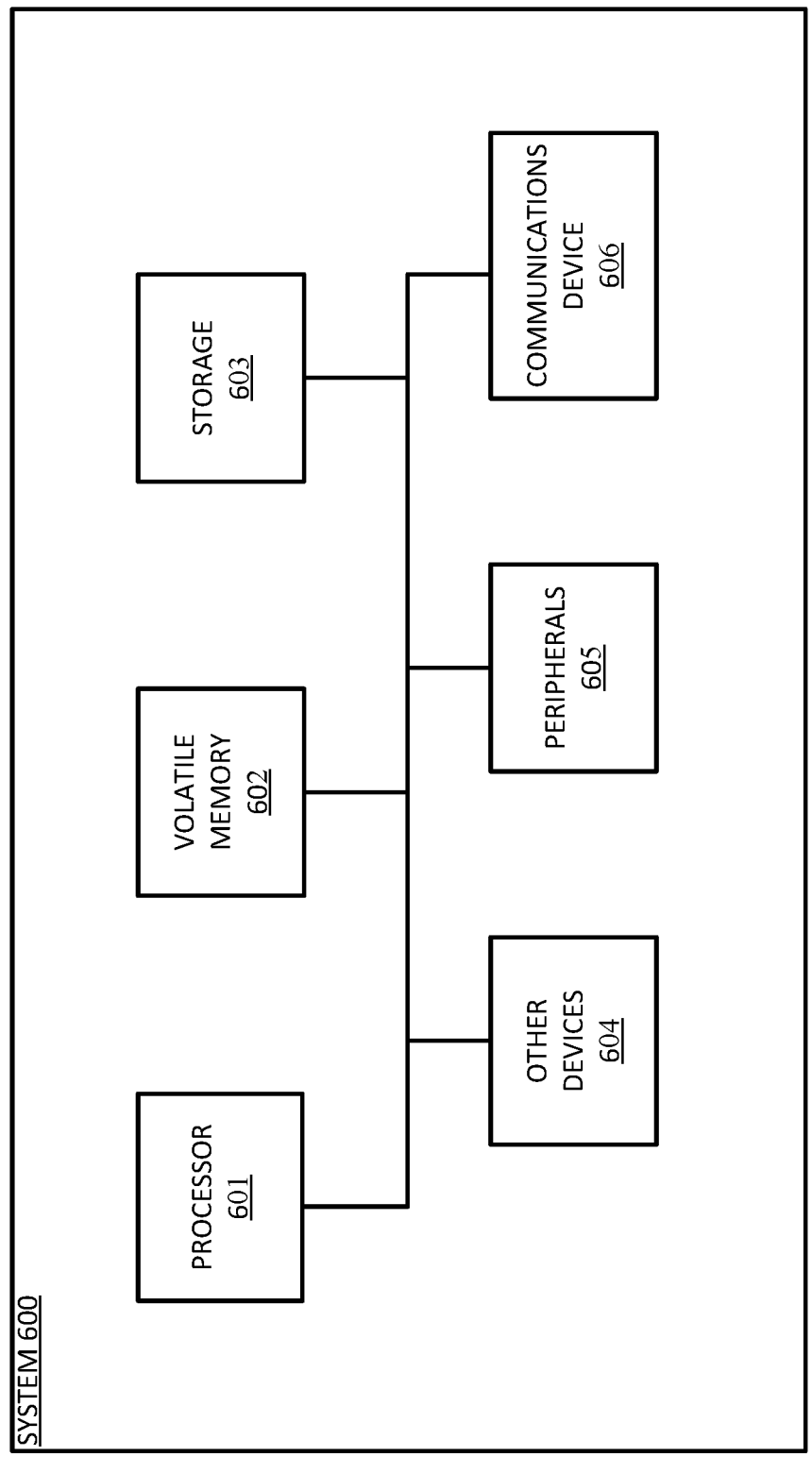
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1

A method, comprising: Example 1. A method, comprising: receiving a list of content recommendation actions, each content recommendation action being associated with one or more trigger phrases comprising conditions for the content recommendation action to be performed, each trigger phrase being associated with a party the trigger phrase is to be uttered by; connecting to a communication session with a plurality of participants; receiving a plurality of utterances associated with the participants in real time during the communication session; for each utterance, determining whether a prediction of relatedness is present between the utterance and one or more trigger phrases associated with a content recommendation action from the list of content recommendation actions; and upon determining that a prediction of relatedness is present, performing the associated content recommendation action by transmitting, to one or more client devices, one or more pieces of content to be recommended.

Example 2

The method of example 1, further comprising: receiving a plurality of pieces of content; and extracting, from each piece of content, a plurality of keywords representing the content; for each utterance, determining whether a prediction of relatedness is present between the utterance and the plurality of keywords representing the content; and upon determining that a prediction of relatedness is present, transmitting, to one or more client devices, one or more pieces of content from which the related keyword was extracted.

Example 3

The method of example 2, wherein the matching is performed by a prototypical network using few-shot detection techniques.

Example 4

The method of any of examples 1-3, wherein the party associated with each trigger phrase may be one or both of: a recipient party, and a customer party.

Example 5

The method of any of examples 1-4, wherein receiving the list of content recommendation actions comprises: presenting, to a client device associated with a user of a communication platform, a user interface (UI) comprising a prompt for the user to submit one or more content recommendation actions and one or more trigger phrases associated with the content recommendation actions.

Example 6

The method of any of examples 1-5, wherein at least a subset of the content recommendation actions comprises at least one of: a recommended response to be uttered, one or more pieces of content to be recommended, and one or more content links to be provided.

Example 7

The method of any of examples 1-6, wherein the one or more pieces of content to be recommended are directed to a recipient party to provide a response to a customer party.

Example 8

The method of example 7, wherein the recipient party comprises one or more of: a sales agent, a customer service agent, and a technical support agent.

Example 9

The method of any of examples 1-8, wherein determining whether the predictions of relatedness are present further comprises determining whether a prediction of relatedness is present between the utterance and one or more variations on the one or more trigger phrases associated with the content recommendation action.

Example 10

The method of any of examples 1-9, wherein determining whether a prediction of relatedness is present is performed at least in part by one or more sentence embedding models.

Example 11

The method of any of examples 1-10, further comprising: generating, based on the received list of content recommendation actions, one or more additional trigger phrases to be associated with one or more of the content recommendation actions.

Example 12

The method of any of examples 1-11, further comprising: detecting that one of the trigger phrases has been associated with a content recommendation action that differs in intent from the trigger phrase; and associating the trigger phrase with a different content recommendation action.

Example 13

The method of any of examples 1-12, wherein a subset of the trigger phrases are each associated with a plurality of content recommendation actions.

Example 15

The method of example 14, wherein determining whether the prediction of relatedness is present is performed at least in part by one or more intent detection algorithms.

Example 16

The method of example 14, wherein determining whether the prediction of relatedness is present is performed at least in part using one or more of: few-shot detection techniques, and zero-shot detection techniques.

Example 17

The method of example 14, wherein determining whether the prediction of relatedness is present is performed at least in part by a meta-learning framework.

Example 18

The method of example 14, wherein determining whether the prediction of relatedness is present is performed at least in part via a prototypical neural network ("ProtoNet").

Example 19

The method of example 14, wherein determining whether the prediction of relatedness is present is performed at least in part by one or more pre-trained language learning models.

Example 20

A communication system comprising one or more processors configured to perform the operations of: receiving a list of content recommendation actions, each content recommendation action being associated with one or more trigger phrases comprising conditions for the content recommendation action to be performed, each trigger phrase being associated with a party the trigger phrase is to be uttered by; connecting to a communication session with a plurality of participants; receiving a plurality of utterances associated with the participants in real time during the communication session; for each utterance, determining whether a prediction of relatedness is present between the utterance and one or more trigger phrases associated with a content recommendation action from the list of content recommendation actions; and upon determining that a prediction of relatedness is present, performing the associated content recommendation action by transmitting, to one or more client devices, one or more pieces of content to be recommended.

Example 21

The communication system of example 20, the one or more processors further configured to perform the operations of: receiving a plurality of pieces of content; and extracting, from each piece of content, a plurality of keywords representing the content; for each utterance, determining whether a prediction of relatedness is present between the utterance and the plurality of keywords representing the content; and upon determining that a prediction of relatedness is present, transmitting, to one or more client devices, one or more pieces of content from which the related keyword was extracted.

Example 22

The communication system of example 21, wherein the matching is performed by a prototypical network using few-shot detection techniques.

Example 23

The communication system of any of examples 20-22, wherein the party associated with each trigger phrase may be one or both of: a recipient party, and a customer party.

Example 24

The communication system of any of examples 20-23, wherein receiving the list of content recommendation actions comprises: presenting, to a client device associated with a user of a communication platform, a user interface (UI) comprising a prompt for the user to submit one or more content recommendation actions and one or more trigger phrases associated with the content recommendation actions.

Example 25

The communication system of any of examples 20-24, wherein at least a subset of the content recommendation actions comprises at least one of: a recommended response to be uttered, one or more pieces of content to be recommended, and one or more content links to be provided.

Example 26

The communication system of any of examples 20-25, wherein the one or more pieces of content to be recommended are directed to a recipient party to provide a response to a customer party.

Example 27

The communication system of example 26, wherein the recipient party comprises one or more of: a sales agent, a customer service agent, and a technical support agent.

Example 28

The communication system of any of examples 20-27, wherein determining whether the predictions of relatedness are present further comprises determining whether a prediction of relatedness is present between the utterance and one or more variations on the one or more trigger phrases associated with the content recommendation action.

Example 29

The communication system of any of examples 20-28, wherein determining whether a prediction of relatedness is present is performed at least in part by one or more sentence embedding models.

Example 30

The communication system of any of examples 20-29, the one or more processors further configured to perform the operations of: generating, based on the received list of content recommendation actions, one or more additional trigger phrases to be associated with one or more of the content recommendation actions.

Example 31

The communication system of any of examples 20-30, the one or more processors further configured to perform the operations of: detecting that one of the trigger phrases has been associated with a content recommendation action that differs in intent from the trigger phrase; and associating the trigger phrase with a different content recommendation action.

Example 32

The communication system of any of examples 20-31, wherein a subset of the trigger phrases are each associated with a plurality of content recommendation actions.

Example 32

The communication system of example 32, wherein determining whether the prediction of relatedness is present is performed at least in part by one or more intent detection algorithms.

Example 33

The communication system of example 32, wherein determining whether the prediction of relatedness is present is performed at least in part using one or more of: few-shot detection techniques, and zero-shot detection techniques.

Example 34

The communication system of example 32, wherein determining whether the prediction of relatedness is present is performed at least in part by a meta-learning framework.

Example 35

The communication system of example 14, wherein determining whether the prediction of relatedness is present is performed at least in part via a prototypical neural network ("ProtoNet").

Example 36

The communication system of example 32, wherein determining whether the prediction of relatedness is present is performed at least in part by one or more pre-trained language learning models.

Example 37

A non-transitory computer-readable medium comprising: instructions for receiving a list of content recommendation actions, each content recommendation action being associated with one or more trigger phrases comprising conditions for the content recommendation action to be performed, each trigger phrase being associated with a party the trigger phrase is to be uttered by; instructions for connecting to a communication session with a plurality of participants; instructions for receiving a plurality of utterances associated with the participants in real time during the communication session; for each utterance, instructions for determining whether a prediction of relatedness is present between the utterance and one or more trigger phrases associated with a content recommendation action from the list of content recommendation actions; and upon determining that a prediction of relatedness is present, instructions for performing the associated content recommendation action by transmitting, to one or more client devices, one or more pieces of content to be recommended.

Example 38

The non-transitory computer-readable medium of example 37, further comprising: receiving a plurality of pieces of content; and extracting, from each piece of content, a plurality of keywords representing the content; for each utterance, determining whether a prediction of relatedness is present between the utterance and the plurality of keywords representing the content; and upon determining that a prediction of relatedness is present, transmitting, to one or more client devices, one or more pieces of content from which the related keyword was extracted.

Example 39

The non-transitory computer-readable medium of example 38, wherein the matching is performed by a prototypical network using few-shot detection techniques.

Example 40

The non-transitory computer-readable medium of claim 37, wherein the party associated with each trigger phrase may be one or both of: a recipient party, and a customer party.

Example 41

The non-transitory computer-readable medium of any of examples 37-40, wherein receiving the list of content recommendation actions comprises: presenting, to a client device associated with a user of a communication platform, a user interface (UI) comprising a prompt for the user to submit one or more content recommendation actions and one or more trigger phrases associated with the content recommendation actions.

Example 42

The non-transitory computer-readable medium of any of examples 37-41, wherein at least a subset of the content recommendation actions comprises at least one of: a recommended response to be uttered, one or more pieces of content to be recommended, and one or more content links to be provided.

Example 43

The non-transitory computer-readable medium of any of examples 37-42, wherein the one or more pieces of content to be recommended are directed to a recipient party to provide a response to a customer party.

Example 44

The non-transitory computer-readable medium of example 43, wherein the recipient party comprises one or more of: a sales agent, a customer service agent, and a technical support agent.

Example 45

The non-transitory computer-readable medium of any of examples 37-44, wherein determining whether the predictions of relatedness are present further comprises determining whether a prediction of relatedness is present between the utterance and one or more variations on the one or more trigger phrases associated with the content recommendation action.

Example 46

The non-transitory computer-readable medium of any of examples 37-45, wherein determining whether a prediction of relatedness is present is performed at least in part by one or more sentence embedding models.

Example 47

The non-transitory computer-readable medium of any of examples 37-46, further comprising: generating, based on the received list of content recommendation actions, one or more additional trigger phrases to be associated with one or more of the content recommendation actions.

Example 48

The non-transitory computer-readable medium of any of examples 37-47, further comprising: detecting that one of the trigger phrases has been associated with a content recommendation action that differs in intent from the trigger phrase; and associating the trigger phrase with a different content recommendation action.

Example 49

The non-transitory computer-readable medium of any of examples 37-48, wherein a subset of the trigger phrases are each associated with a plurality of content recommendation actions.

Example 50

The non-transitory computer-readable medium of example 49, wherein determining whether the prediction of relatedness is present is performed at least in part by one or more intent detection algorithms.

Example 51

The non-transitory computer-readable medium of example 49, wherein determining whether the prediction of relatedness is present is performed at least in part using one or more of: few-shot detection techniques, and zero-shot detection techniques.

Example 52

The non-transitory computer-readable medium of example 49, wherein determining whether the prediction of relatedness is present is performed at least in part by a meta-learning framework.

Example 53

The non-transitory computer-readable medium of example 49, wherein determining whether the prediction of relatedness is present is performed at least in part via a prototypical neural network ("ProtoNet").

Example 54

The non-transitory computer-readable medium of example 49, wherein determining whether the prediction of relatedness is present is performed at least in part by one or more pre-trained language learning models.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    receiving a list of content recommendation actions specifically adjusted for a particular type of communication session, each content recommendation action being associated with one or more trigger phrases comprising conditions for performance of the content recommendation action during the particular communication session, each trigger phrase being associated with a party the trigger phrase is to be uttered by, wherein the content recommendation actions and corresponding trigger phrases are generated based on actions and trigger phrases performed by other users of a communication platform;
    connecting to the communication session with a plurality of participants;
    receiving a plurality of utterances associated with the participants in real time during the communication session, wherein each utterance is associated with a speaker;
    for each utterance, determining, by one or more pretrained language learning models, whether a prediction of relatedness is present between the utterance and one or more trigger phrases associated with a content recommendation action from the list of content recommendation actions;
    for each utterance, determining whether the speaker associated with the utterance is the party associated with the trigger phrase and the content recommendation action; and
    upon determining that a prediction of relatedness is present and that the speaker is the party, performing the associated content recommendation action by transmitting, to one or more client devices, one or more pieces of content for display on the one or more client devices during the communication session, wherein the one or more pieces of content includes the corresponding trigger phrase.

2. The method of claim 1, further comprising:
    receiving a plurality of pieces of content; and
    extracting, from each piece of content, a plurality of keywords representing the content;
    for each utterance, determining whether a prediction of relatedness is present between the utterance and the plurality of keywords representing the content; and
    upon determining that a prediction of relatedness is present, transmitting, to one or more client devices, one or more pieces of content from which the related keyword was extracted.

3. The method of claim 1, wherein the party associated with each trigger phrase may be one or both of: a recipient party, and a customer party.

4. The method of claim 1, wherein receiving the list of content recommendation actions comprises:
    presenting, to a client device associated with a user of the communication platform, a user interface (UI) comprising a prompt for the user to submit one or more content recommendation actions and one or more trigger phrases associated with the content recommendation actions.

5. The method of claim 1, wherein at least a subset of the content recommendation actions comprises at least one of: a recommended response to be uttered, one or more pieces of content to be recommended, and one or more content links to be provided.

6. The method of claim 1, wherein the one or more pieces of content to be recommended are directed to a recipient party to provide a response to a customer party.

7. The method of claim 6, wherein the recipient party comprises one or more of: a sales agent, a customer service agent, and a technical support agent.

8. The method of claim 1, wherein determining whether the predictions of relatedness are present further comprises determining whether a prediction of relatedness is present between the utterance and one or more variations on the one or more trigger phrases associated with the content recommendation action.

9. The method of claim 1, wherein determining whether a prediction of relatedness is present is performed at least in part by one or more sentence embedding models.

10. The method of claim 1, further comprising:
generating, based on the received list of content recommendation actions, one or more additional trigger phrases to be associated with one or more of the content recommendation actions.

11. The method of claim 1, further comprising:
detecting that one of the trigger phrases has been associated with a content recommendation action that differs in intent from the trigger phrase; and
associating the trigger phrase with a different content recommendation action.

12. The method of claim 1, wherein a subset of the trigger phrases are each associated with a plurality of content recommendation actions.

13. A communication system comprising one or more processors configured to perform operations of:
receiving a list of content recommendation actions specifically adjusted for a particular type of communication session, each content recommendation action being associated with one or more trigger phrases comprising conditions for performance of the content recommendation action to during the particular communication session, each trigger phrase being associated with a party the trigger phrase is to be uttered by, wherein the content recommendation actions and corresponding trigger phrases are generated based on actions and trigger phrases performed by other users of a communication platform;
connecting to the communication session with a plurality of participants;
receiving a plurality of utterances associated with the participants in real time during the communication session, wherein each utterance is associated with a speaker;
for each utterance, determining, by one or more pre-trained language learning models, whether a prediction of relatedness is present between the utterance and one or more trigger phrases associated with a content recommendation action from the list of content recommendation actions;
for each utterance, determining whether the speaker associated with the utterance is the party associated with the trigger phrase and the content recommendation action; and
upon determining that a prediction of relatedness is present and that the speaker is the party, performing the associated content recommendation action by transmitting, to one or more client devices, one or more pieces of content for display on the one or more client devices during the communication session, wherein the one or more pieces of content includes the corresponding trigger phrase.

14. The communication system of claim 13, wherein determining whether the prediction of relatedness is present is performed at least in part by one or more intent detection algorithms.

15. The communications system of claim 13, wherein the one or more pieces of content to be recommended are directed to a recipient party to provide a response to a customer party.

16. The communications system of claim 13, wherein determining whether the predictions of relatedness are present further comprises determining whether a prediction of relatedness is present between the utterance and one or more variations on the one or more trigger phrases associated with the content recommendation action.

17. A non-transitory computer-readable medium comprising:
instructions for receiving a list of content recommendation actions specifically adjusted for a particular type of communication session, each content recommendation action being associated with one or more trigger phrases comprising conditions for performance of the content recommendation action during the particular communication session, each trigger phrase being associated with a party the trigger phrase is to be uttered by, wherein the content recommendation actions and corresponding trigger phrases are generated based on actions and trigger phrases performed by other users of a communication platform;
instructions for connecting to the communication session with a plurality of participants;
instructions for receiving a plurality of utterances associated with the participants in real time during the communication session, wherein each utterance is associated with a speaker;
for each utterance, instructions for determining, by one or more pre-trained language learning models, whether a prediction of relatedness is present between the utterance and one or more trigger phrases associated with a content recommendation action from the list of content recommendation actions;
for each utterance, determining whether the speaker associated with the utterance is the party associated with the trigger phrase and the content recommendation action; and
upon determining that a prediction of relatedness is present and that the speaker is the party, instructions for performing the associated content recommendation action by transmitting, to one or more client devices, one or more pieces of content for display on the one or more client devices during the communication session, wherein the one or more pieces of content includes the corresponding trigger phrase.

18. The non-transitory computer-readable medium of claim 17, wherein the party associated with each trigger phrase may be one or both of: a recipient party, and a customer party.

19. The non-transitory computer-readable medium of claim 17, wherein the instructions for receiving the list of content recommendation actions comprises:
instructions for presenting, to a client device associated with a user of the communication platform, a user interface (UI) comprising a prompt for the user to submit one or more content recommendation actions and one or more trigger phrases associated with the content recommendation actions.

20. The non-transitory computer-readable medium of claim 17, wherein at least a subset of the content recommendation actions comprises at least one of: a recommended response to be uttered, one or more pieces of content to be recommended, and one or more content links to be provided.

* * * * *